US009233690B2

(12) United States Patent
Eriksson et al.

(10) Patent No.: US 9,233,690 B2
(45) Date of Patent: Jan. 12, 2016

(54) ARRANGEMENT AND METHOD FOR ADAPTING A CRUISE CONTROL SYSTEM IN A VEHICLE

(75) Inventors: Anders Eriksson, Torslanda (SE); Johan Bjernetun, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 75 days.

(21) Appl. No.: 14/349,340

(22) PCT Filed: Oct. 5, 2011

(86) PCT No.: PCT/EP2011/004951
§ 371 (c)(1),
(2), (4) Date: May 6, 2014

(87) PCT Pub. No.: WO2013/050052
PCT Pub. Date: Apr. 11, 2013

(65) Prior Publication Data
US 2014/0236448 A1    Aug. 21, 2014

(51) Int. Cl.
*B60T 8/32*     (2006.01)
*B60W 30/14*    (2006.01)
*B60K 31/06*    (2006.01)
*B60W 50/08*    (2012.01)
*B60K 31/00*    (2006.01)

(52) U.S. Cl.
CPC .............. *B60W 30/143* (2013.01); *B60K 31/06* (2013.01); *B60W 50/082* (2013.01); *B60K 2031/0091* (2013.01); *B60K 2310/244* (2013.01); *B60W 2540/04* (2013.01); *Y02T 10/52* (2013.01)

(58) Field of Classification Search
CPC ... B60W 30/143; B60W 50/082; B60K 31/06
See application file for complete search history.

(56) References Cited

U.S. PATENT DOCUMENTS 6,011,915 A * 1/2000 Aaker .................. G06F 13/107
                                                        703/23
6,347,273 B1 * 2/2002 Adelsson et al. ............... 701/96
(Continued)

FOREIGN PATENT DOCUMENTS

DE    102006060554 A1    6/2008
FR        2863214 A1    6/2005
JP       2009090810 A   10/2007

OTHER PUBLICATIONS

International Search Report (Aug. 29, 2012) for corresponding International Application PCT/EP2011/004951.
(Continued)

*Primary Examiner* — Calvin Cheung
(74) *Attorney, Agent, or Firm* — WRB-IP LLP

(57) ABSTRACT

A cruise control arrangement for a vehicle includes a cruise control speed function, a cruise control brake function and at least one selectable economy level, having a set maximum speed value corresponding to a maximum allowed vehicle speed, a set brake speed value corresponding to a brake cruise speed and a set cruise speed value corresponding to a cruise speed, where a temporary brake speed value replaces the set brake speed value as the actually used brake speed value, and where the temporary brake speed value is dependent on the selected economy level. The behavior of the cruise control of a vehicle can be adapted to take account of economy, which makes it possible to optimize the fuel consumption of the vehicle.

15 Claims, 1 Drawing Sheet

(56) References Cited

U.S. PATENT DOCUMENTS

| | | | |
|---|---|---|---|
| 7,490,000 B2* | 2/2009 | Siddiqui et al. | 701/104 |
| 8,855,874 B2* | 10/2014 | Eriksson et al. | 701/53 |
| 2013/0158829 A1* | 6/2013 | Schumann | 701/93 |

OTHER PUBLICATIONS

Japanese Official Action (Aug. 5, 2015) for corresponding Japanese App. 2014-533770.

* cited by examiner

ARRANGEMENT AND METHOD FOR ADAPTING A CRUISE CONTROL SYSTEM IN A VEHICLE

BACKGROUND AND SUMMARY

The present invention relates to an arrangement and a method for adapting a cruise control system of a vehicle. The invention further relates to a computer program adapted to perform such a method in a cruise control system when said program is run on a computer, and a computer program product comprising such program code means stored on a computer readable medium. The arrangement is suitable gear vehicles of different kinds which are provided with economy driving settings.

Modern vehicles are often provided with a cruise control system in order to improve the comfort of a driver. Some cruise control system are provided with further functions, such as an adaptive control system that uses distance measuring equipment to monitor the distance to a vehicle in front of the own vehicle, in order to be able to adapt the cruise speed to the speed of the vehicle in front. Such a system will improve the safety of the cruise control system since a minimum distance to the vehicle in front will be maintained. Some systems will also brake the vehicle if the minimum distance is not maintained, or if the distance to the vehicle in front decreases at a certain rate. The cruise control system may be adapted to maintain a set speed by using only the accelerator, or by also using the brakes of the vehicle. This is especially common in heavy vehicles which are equipped with auxiliary brakes, such as engine brakes and retarders. A further function of the cruise control system of the vehicle may be an economy dove setting, in which the regulating parameters of cruise control system are ruled by economy.

The cruise control system has a regulating range in which the actual speed value is maintained. For a system using only the accelerator to maintain the speed, an excessive speed of a few percent may be allowed. Typically, the speed ma in this case vary between e.g. 68 to 72 when the speed is set to 70 km/h. It may be possible to set the maximal allowed excessive speed value for the vehicle. In this way, the system can allow the vehicle to travel at an excessive speed at certain occasions, e.g. when travelling on a slight descent.

When the brake system is also used to maintain the speed of the vehicle, referred to as a brake cruise system, a specified excessive speed can also be allowed for a vehicle rolling down a fairly steep downhill slope. An allowed excessive speed may help to preserve energy by using the momentum of the vehicle. The limit for the allowed excessive speed must of course be set to a value that does not endanger other vehicles.

There are however situations in which the traditional regulating method of the cruise control system does not work in a fuel efficient way. Such situations may e.g. be when the vehicle travels in ascents and descents or when a sudden change in pace is required. In an ascent, a cruise control system of the kind mentioned above will try to maintain a speed of 68 km/h regardless of the steepness of the ascent. This may lead to the vehicle travelling up an ascent with full throttle. In the same way, the speed of the vehicle travelling down a descent is maintained at 72 km/h by engaging the brakes.

There is thus a need for an improved cruise control system that is more energy efficient.

It is desirable to provide an improved cruise control arrangement for a vehicle, where the cruise control operation is adapted to an economy setting. It is also desirable to provide an improved method for adapting the operation of a cruise control system of a vehicle.

In a cruise control arrangement for a vehicle, where the cruise control arrangement is provided with a cruise control speed function, a cruise control brake function and at least one selectable economy level, where the arrangement has a set maximum speed value corresponding to a maximum allowed vehicle speed, a set brake speed value corresponding to a brake cruise speed and a set cruise speed value corresponding to a cruise speed, the problem is solved in that a temporary brake speed value replaces the set brake speed value as the actually used brake speed value when an economy level is selected, where the temporary brake speed value is dependent on the selected economy level.

By this first embodiment of the cruise control arrangement, the arrangement replaces the set brake speed value with a temporary brake speed value depending on a selected economy level. The set brake speed value is kept, and the temporary brake speed value is used as the actual brake speed value as long as the selected economy level is selected. If another economy level is selected, a new temporary brake speed value will be used depending on the selected economy level. If the economy function is switched off, the set brake speed value will be used again as the actual brake speed value. In this embodiment, a cruise control function that is more energy efficient is obtained, in that the allowed speed offset from the set cruise speed is adapted in dependence of the selected economy level. By selecting an economy level, a greater difference between the set cruise speed and the used brake speed is obtained, as compared with no economy level. For a system having several economy levels, the selection of a higher economy level will generate an even greater difference between the set cruise speed and the used brake speed. A greater speed difference between the set cruise speed and the used brake speed will allow the vehicle to preserve more momentum when travelling down a hill, which will save fuel. The set brake speed value is kept as the default brake speed value. The set brake speed value is used together with an offset speed value corresponding to the selected economy level to obtain the temporary brake speed value.

In an advantageous development of the inventive arrangement, the temporary brake speed value is not allowed to be greater than the set maximum speed value. If the sum of the set brake speed value and the offset speed value is equal or larger than the set maximum speed value, the temporary brake speed value is set equal to the set maximum speed value. In this way, it is guaranteed that the maximum speed of the vehicle is held within the predefined limits.

In an advantageous development of the inventive arrangement, the set cruise speed value can also be replaced with a temporary cruise speed value. The temporary cruise speed value is dependent on the selected economy level and the temporary brake speed value. Since the temporary brake speed value gives a larger difference between the used brake speed value and the set cruise speed value, it may be necessary to replace the set cruise speed value with a temporary cruise speed value in order to obtain the desired difference between the used brake speed value and the used cruise speed value. This is the case when the temporary brake speed value is set equal to the set maximum speed value. In this case, the temporary cruise control speed is selected such that the speed interval between the temporary cruise control speed and the set maximum speed value is the same as the speed interval between the set cruise control speed and the sum of the set brake speed value and the offset speed value.

In an advantageous development of the inventive arrangement, the temporary cruise speed value is used as the actual cruise speed value until the economy level is changed to a level where the speed interval between the set maximum speed value and the temporary cruise speed value corresponds to the speed interval between the set cruise speed value and the offset speed value added to the set brake speed value. Further, the set cruise speed value is used as the actual cruise speed value when the speed interval between the set maximum speed value and the set cruise speed value is smaller than the speed interval between the set cruise speed value and the offset speed value added to the set brake speed value. In this way, the original settings of the cruise control systems remains untouched and can be used by the driver when the economy level is switched off without having to re-enter the settings again. This will enhance the safety of the system since the driver is not exposed to any surprises when it comes to the cruise control settings.

In a method for changing the reference brake speed value in a cruise control arrangement for a vehicle comprising a cruise control speed function, a cruise control brake function and at least one selectable economy level, having a set maximum speed value, a set brake speed value and a set cruise speed value, the steps of adding an offset speed value corresponding to a selected economy level to the set brake speed value and using the sun of the offset speed value and the set brake speed value as a temporary brake speed value are comprised.

With the inventive method, an optimized behaviour of the cruise control system of a vehicle can be obtained, in which the cruise control system is adapted to the road characteristics. In this way, the fuel consumption can be lowered compared with a cruise control using nominal set parameters to regulate the operation of the vehicle.

BRIEF DESCRIPTION OF DRAWINGS

The invention will be described in greater detail in the following, with reference to the attached drawings, in which.

DETAILED DESCRIPTION

The embodiments of the invention with further developments described in the following are to be regarded only as examples and are in no way to limit the scope of the protection provided by the patent claims. The arrangement is suitable for all kinds of vehicles, but is especially suitable for heavy vehicles such as trucks and busses, having brake cruise control functionality using auxiliary brakes.

Figure 1:
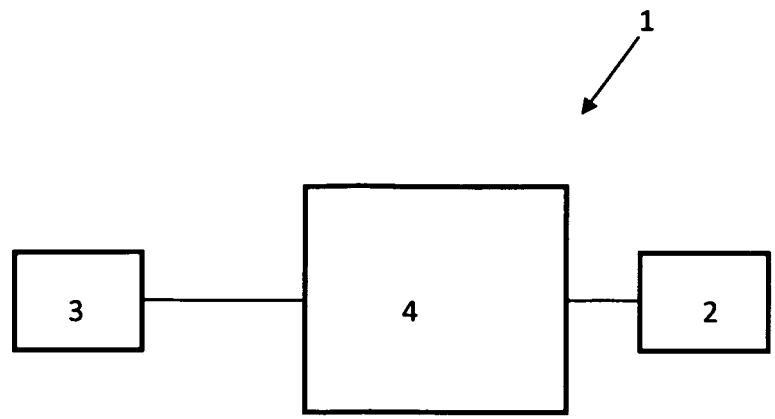
FIG. 1 shows a schematic view of an arrangement for adapting the operation of a cruise control system.

FIG. 1 shows a schematic arrangement for adapting the cruise control system of a vehicle depending on a selected economy level. The arrangement 1 comprises a cruise control electronic control unit 4 which may be either a standalone control unit comprising the cruise control system or may be integrated e.g. as a software module in another electronic control unit in the vehicle. The cruise control arrangement further comprises a user interface 2. The user interface comprises buttons used by a driver to input cruise control parameters and to engage and disengage the cruise control system. The user interface may further comprise display means showing part of or all selected cruise control parameters. In the arrangement, a maximum speed value which is the highest allowed speed value with which the vehicle is allowed to travel can be set. The maximum speed value may be set by the driver or may be preset by the manufacturer and may be governed by legislation in some markets.

The driver can also set or select a cruise speed, which is the reference speed that the vehicle will maintain when the cruise control is engaged. The cruise control system is provided with a preset speed interval around the set cruise speed, e.g. +−1 km/h, in which the cruise speed will be held during cruise control regulation. When the vehicle travels on a substantially even road and the cruise speed is set to 70 km/h, the speed may vary between 69 km/h to 71 km/h.

The driver can further set a brake speed value, which is the speed value that the brake cruise control will maintain when the vehicle is travelling down descents. The brake speed value is normally set as a positive speed offset value that is added to the set cruise speed. If the brake speed offset is set to 4 km/h, the resulting brake speed would in this case be 74 km/h. This speed will be maintained by the auxiliary brakes of the vehicle when the vehicle travels down a descent and where the vehicle will coast faster than the cruise speed. By allowing an excessive speed when travelling down a hill, the travel efficiency can be improved. At the same time, the excessive speed should not be allowed to be too high, such that the vehicle will not be able to stop or such that it will exceed speed limits.

The arrangement further comprises an economy level selector 3, by which the driver can select one or more economy levels. The economy level selector may be integrated in the user interface 2 or may be separate buttons. The number of economy levels may vary, but a few different levels are preferred. In the example given below, three economy levels will be used. The selected economy level may affect different settings on the vehicle, such as engine parameters and gearbox parameters. For the cruise control arrangement, the selected economy level corresponds to a speed interval between the set cruise speed and the set brake speed, referred to as the cruise-brake speed interval. In this example, the preset speed interval is 1 km/h when the economy function is disengaged, i.e. the cruise speed regulating interval is +−1 km/h. For economy level 1, the speed interval is 3 km/h, for economy level 2, the speed interval is 5 km/h and for economy level 3, the speed interval is 7 km/h. Further, the maximum speed value is preset to 90 km/h, the brake cruise speed offset is set to +2 km/h by the driver which gives a brake cruise speed of 87 km/h and the cruise speed is set by the driver to 85 km/h.

With the economy function disengaged, this gives a cruise control having a regulating interval of +−1 km/h around 85 km/h and a set brake cruise speed of 87 km/h. When the driver selects the first economy level, the cruise-brake speed interval corresponding to the first economy level is 3 km/h, which will give a brake cruise speed of 88 km/h. Thus, a temporary brake speed value of 88 km/h will replace the set brake cruise speed. Thus, when the vehicle travels down a hill, a speed of 88 km/h will be maintained.

By selecting economy level 2, a cruise-brake speed interval of 5 km/h will be selected, which gives a temporary brake speed value of 90 km/h. By selecting economy level 3, the corresponding cruise-brake speed interval is 7 km/h, which would result in a temporary brake speed value of 92 km/h. Since the maximum allowed speed value is preset to 90 km/h, to higher temporary brake speed value cannot be allowed. Instead, the temporary brake speed value is set equal to the maximum speed value such that the temporary brake speed value will still be 90 km/h. In order to obtain the desired economy state, i.e. the cruise-brake speed interval of 7 km/h, the set cruise speed is replaced with a temporary cruise speed such that the cruise-brake speed interval corresponds to the selected economy level. In this case, the temporary cruise speed value used as the actual cruise speed will thus be 83 km/h. In this way, the desired cruise-brake speed interval corresponding to the selected economy level is possible to reach.

The temporary cruise speed will be used until the economy level is changed. Should the economy level be changed back to economy level 2, the temporary brake speed will be set to a value corresponding to the selected economy level. In this case, the temporary brake speed will remain at 90 km/h, since the set cruise speed is 85 km/h and the cruise-brake speed interval corresponding to the selected economy level is 5 km/h. The temporary cruise speed can now be changed back to 65 km/h. If the economy level is changed when the vehicle is travelling with the temporary cruise speed of 83 km/h, this temporary cruise speed will remain until the actual speed of the vehicle corresponds to the set cruise speed, i.e. 85 km/h, which will occur when the vehicle travels down a hill. In this way, there will not be a sudden acceleration of the vehicle when the driver selects another economy level.

If the driver disengages the economy function completely, the cruise control will resume with the set parameters, i.e. the set cruise speed and the set brake speed. If a temporary cruise speed is lower than the set cruise speed, the set cruise speed will be used first when the actual speed of the vehicle corresponds to the set cruise speed or when the cruise control arrangement is disengaged. Since the set brake speed is always lower than the temporary brake speed, the set brake speed can always be used directly.

Figure 2:
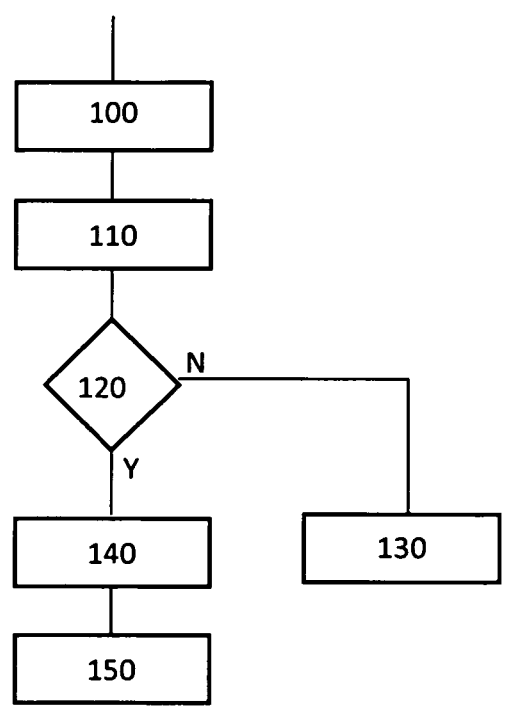
FIG. 2 shows a schematic flow chart of an inventive method for adapting the cruise control system of a vehicle.

FIG. 2 shows a schematic flow chart of a method for changing the temporary brake speed value in a cruise control arrangement in a vehicle according to the invention. The arrangement comprises a cruise control speed function, a cruise control brake function and at least one selectable economy level, and the arrangement has a set maximum speed value, a set brake speed value and a set cruise speed value.

In step 100, an economy level is selected by the driver. In step 110, an offset speed value corresponding to the selected economy level is added to the set brake speed value.

In step 120, the sum of the offset speed value corresponding to the selected economy level and the set brake speed value is compared to the set maximum speed value. If the sum is equal to or smaller than the set maximum speed value, the temporary brake speed value is set to the sum of the offset speed value and the set brake speed in step 130.

If the sum of the offset speed value corresponding to the selected economy level and the set brake speed value is larger than the set maximum speed value, the temporary brake speed value is set to the set maximum speed value in step 140.

In this case, a temporary cruise speed value will be used as the actual cruise speed in step 150. The temporary cruise speed value will be selected such that the speed interval between the temporary cruise speed and the set maximum speed is equal to the cruise-brake speed interval. The cruise-brake speed interval is the difference between the set cruise speed and the sum of the offset speed value corresponding to the selected economy level and the set brake speed.

The invention is not to be regarded as being limited to the embodiments described above, a number of additional variants and modifications being possible within the scope of the subsequent patent claims.

The invention claimed is:

1. A cruise control arrangement for a vehicle, the cruise control arrangement comprising
a cruise control speed function;
a cruise control brake function; and
at least one selectable economy level;
where the cruise control arrangement has
a set maximum speed value corresponding to a maximum allowed vehicle speed,
a set brake speed value corresponding to a brake cruise speed, and
a set cruise speed valise corresponding to a cruise speed,
wherein a temporary brake speed value replaces the set brake speed value as the actually used brake speed value when an economy level is selected,
where the temporary brake speed value is dependent on the selected economy level.

2. The cruise control arrangement according to claim 1, wherein a temporary cruise speed value replaces the set cruise speed value as the actually used cruise speed value when an economy level is selected, where the temporary cruise speed value is dependent on the selected economy level.

3. The cruise control arrangement according, to claim 1, wherein the set maximum speed value is higher than the set brake speed value and the set brake speed value is higher than the set cruise speed value.

4. The cruise control arrangement according to claim 1, wherein the arrangement comprises a plurality of economy levels.

5. The cruise control arrangement according to claim wherein each economy level corresponds to a offset speed value.

6. The cruise control arrangement according to claim 5, wherein the offset speed value for a selected economy level is added to the set brake speed value in order to obtain the temporary brake speed value.

7. The cruise control arrangement according to claim 5, wherein the temporary brake speed value is set equal to the set maximum speed value when the sum of the offset speed value and the set brake speed value is larger than the set maximum speed value.

8. The cruise control arrangement according to claim 5, wherein the temporary cruise speed value is lowered such that the speed interval between the set maximum speed value and the temporary cruise speed value is equal to the speed interval between the set cruise speed value and the offset speed value added to the set brake speed value.

9. The cruise control arrangement according, to claim 8, wherein the temporary cruise speed value is used as the actual cruise speed value until the economy level is changed to a level where the speed interval, between the set maximum speed value and the temporary cruise speed value corresponds to the speed interval between the set cruise speed value and the offset speed value added to the set brake speed value, and where the set cruise speed value is used as the actual cruise speed value when the speed interval between the set maximum speed value and the set cruise speed value is smaller than the speed interval between the set cruise speed value and the offset speed value added to the set brake speed value.

10. A vehicle comprising
a cruise control arrangement, the cruise control arrangement comprising
a cruise control speed function;
a cruise control brake function; and
at least one selectable economy level;
where the cruise control arrangement has
a set maximum speed value corresponding to a maximum allowed vehicle speed,
a set brake speed value corresponding to a brake cruise speed and
a set cruise speed value corresponding to a cruise speed,
wherein a temporary brake speed value replaces the set brake speed value as the actually used brake speed value when an economy level is selected, where the temporary brake speed value is dependent on the selected economy level.

11. A method for changing the temporary brake speed value in a cruise control arrangement for a vehicle comprising
a cruise control speed function;
a cruise control brake function; and
at least one selectable economy level;
where the cruise control arrangement having a set maximum speed value, a set brake speed value and a set cruise speed value, comprising:
adding an offset speed value corresponding to a selected economy level to the set brake speed value; and
using the sum of the offset value and the set brake speed value as a temporary brake speed value.

12. The method according to claim 11, further comprising the following step:
setting the temporary brake speed value equal to the set maximum speed value when the sum of the offset speed value and the set brake speed value is lamer than the set maximum speed value.

13. The method according to claim 11, further comprising the following step:
lowering the temporary cruise speed value such that the speed interval between the set maximum speed value and the temporary cruise speed value corresponds to the speed interval between the set cruise speed value and the offset speed value added to the set brake speed value.

14. The method according to claim 13, further comprising the following step:
using the temporary cruise speed value until the economy level is changed to a level where the speed interval between the set maximum speed value and the temporary cruise speed value corresponds to the speed interval between the set cruise speed value and the offset speed value added to the set brake speed value,
using the set cruise speed value as the temporary raise speed value when the speed interval between the set maximum speed value and the temporary cruise speed value is smaller than the speed interval between the set cruise speed value and the offset speed value added to the set brake speed value.

15. A computer programmed for performing a method for changing the temporary brake speed value in a cruise control arrangement for a vehicle comprising
a cruise control speed function;
a cruise control brake function; and
at least one selectable economy level;
where the cruise control arrangement having a set maximum speed value, a set brake speed value and a set cruise speed value, the method comprising:
adding an offset speed value corresponding to a selected economy level to the set brake speed value; and
using the sum of the offset speed value and the set brake speed value as a temporary brake speed value.

* * * * *